(12) United States Patent
Nagase (10) Patent No.: US 12,034,206 B2
(45) Date of Patent: Jul. 9, 2024

(54) ANTENNA DEVICE

(71) Applicant: Mitsubishi Electric Corporation, Tokyo (JP)

(72) Inventor: Akihiro Nagase, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 126 days.

(21) Appl. No.: 17/908,915

(22) PCT Filed: Mar. 17, 2020

(86) PCT No.: PCT/JP2020/011768
§ 371 (c)(1),
(2) Date: Sep. 2, 2022

(87) PCT Pub. No.: WO2021/186568
PCT Pub. Date: Sep. 23, 2021

(65) Prior Publication Data
US 2023/0087437 A1    Mar. 23, 2023

(51) Int. Cl.
*H01Q 1/32* (2006.01)
*B60R 11/02* (2006.01)
*H01Q 1/42* (2006.01)

(52) U.S. Cl.
CPC .............. *H01Q 1/32* (2013.01); *B60R 11/02* (2013.01); *H01Q 1/42* (2013.01)

(58) Field of Classification Search
CPC .......... H01Q 1/32; H01Q 1/3275; H01Q 1/42
See application file for complete search history.

(56) References Cited

FOREIGN PATENT DOCUMENTS

| JP | 2003298270 A | * | 10/2003 | .............. H05K 7/20 |
| JP | 4564483 B2 | | 10/2010 | |
| JP | 2019-118028 A | | 7/2019 | |
| JP | 2019198009 A | * | 11/2019 | ............ H01Q 23/00 |

OTHER PUBLICATIONS

International Search Report and Written Opinion mailed on Jun. 9, 2020, received for PCT Application PCT/JP2020/011768, filed on Mar. 17, 2020, 8 pages including English Translation.
Woodrow Bellamy III, "Carlisle Ready to Cool Electronically Steered Antennas for NextGen Satellites", Avionics International, Available Online At: https://www.aviationtoday.com/eletters/10-18-2019-air/2/, Sep. 13, 2019, pp. 1-4.

* cited by examiner

*Primary Examiner* — Hoang V Nguyen
(74) *Attorney, Agent, or Firm* — XSENSUS LLP (57) ABSTRACT

An antenna device includes an antenna array, an antenna adapter, a radome, a skirt, and a heat pipe. The antenna adapter holds the antenna array including an antenna element that transmits or receives a communication radio wave along a mobile body surface. The radome is disposed so as to cover the antenna adapter. The skirt shields a gap between the radome and the mobile body surface from flowing outside air, and radiates heat from the antenna adapter to an outside of the antenna device. In the antenna adapter, the heat pipe including an evaporator and a condenser is disposed to extend from the antenna array toward the skirt.

10 Claims, 6 Drawing Sheets

ANTENNA DEVICE

CROSS-REFERENCE TO RELATED APPLICATIONS

The present application is based on PCT filing PCT/JP2020/011768, filed Mar. 17, 2020, the entire contents of which are incorporated herein by reference. This application is also related to Ser. No. 17/291,280 filed May 5, 2021, entitled ANTENNA DEVICE, the entire contents of each of which are incorporated herein by reference.

TECHNICAL FIELD

The present disclosure relates to an array-type antenna device mounted on a mobile body.

BACKGROUND ART

In recent years, an Internet service using a satellite line or the like has become available in a mobile body such as an airplane or a railway. In order to comfortably use a content such as a moving image and an image in the mobile body, an antenna device capable of improving a communication speed and increasing a communication capacity is required.

On the other hand, in the mobile body such as an aircraft that moves at a high speed, decreases in an air resistance and a weight are required in order to reduce fuel consumption. In order to decrease the air resistance, a sectional area (hereinafter, referred to as a projection area) of the mobile body needs to be reduced when viewed from a front in a traveling direction, a streamline shape is required in order to decrease separation of a back flow, so that an installation space of the antenna device is limited in the mobile body. In the conventional mechanical drive type antenna device, in order to control directivity by mechanically driving an opening surface of the antenna body and a reflector, a height of about several tens of centimeters needs to accommodate the mechanical drive device in the antenna device. Consequently, when the mechanical drive type antenna device is mounted on the mobile body, there is a limit to the decrease in the air resistance.

Accordingly, a phased array type antenna device has been developed as means for achieving thinning of the antenna device. The phased array type antenna device includes an antenna array in which a plurality of antenna elements is regularly arrayed, and the antenna array can electronically control the directivity by individually performing phase control on a signal transmitted and received by each antenna element, and the entire antenna device can be thinned.

On the other hand, in the phased array type antenna device, an increase in a frequency of the signal and high integration of the antenna elements are required in order to increase the communication speed and the communication capacity, and heat generation density becomes higher than that of the conventional mechanical drive type antenna device. In addition, because the antenna element is configured of a semiconductor, the element needs to be sufficiently cooled and a junction temperature needs to be held less than or equal to about 100° C. in order to obtain desired performance.

Accordingly, a technique of radiating heat by traveling wind obtained by movement of the mobile body has been developed in the phased array type antenna device. For example, in PTL 1, an outer case includes a wiring board, a plurality of antenna elements, a plurality of antenna element operation modules, and a good heat conductor, and a plurality of antenna element accommodating holes that accommodate the plurality of antenna elements arrayed in a predetermined array on one surface of the wiring board are formed in the outer case. The outer case is attached to the surface of the mobile body while one surface of the outer case is exposed to an external space, transfers heat generated by the antenna element operation module to the wiring board and the outer case, and radiates the heat from the outer case by an airflow flowing through one surface of the outer case accompanied by the movement of the mobile body.

On the other hand, when the airflow is difficult to guide a vicinity of the antenna, the configuration of PTL 1 cannot be adopted. On the other hand, PTL 2 describes a device that radiates the heat into the mobile body using a refrigerant pipe and a pump.

CITATION LIST

Patent Literature

PTL 1: Japanese Patent No. 4564483
PTL 2: Japanese Patent Laying-Open No. 2019-118028

SUMMARY OF INVENTION

Technical Problem

In recent years, the Internet service using the satellite line or the like has become available in the mobile body such as the airplane or the railway. However, it is difficult to comfortably handle the content such as the image due to a small communication capacity.

In order to obtain a sufficient communication speed with a limited installation space of the antenna device, the increase in the frequency of the signal and the high integration of the antenna elements are required. However, cooling is required in ensuring the reliability of the element because the heat generation density significantly increases.

When the mobile body is moving at a high speed, the antenna device is cooled by the obtained traveling wind. However, because the antenna device is covered with a radome and is not directly exposed to the outside air, the heat is required to be transported to the external space of the antenna device through an antenna adapter made of a good heat conductive material.

Because the antenna adapter cannot be thickened in the thin antenna device, the heat in a central portion of the array cannot be sufficiently diffused by the antenna adapter, so that there is a problem that sufficient heat radiation cannot be performed.

In such a case, PTL 2 is excellent in that the heat can be stably radiated even when the mobile body is stopped. However, because a pump is used as a mechanical component, maintenance of the pump is required.

Accordingly, an object of the present disclosure is to improve the cooling performance of a thin antenna device without maintenance.

Solution to Problem

An antenna device according to one aspect of the present disclosure includes: an antenna array including an antenna element that transmits or receives a communication radio wave; an antenna adapter holding the antenna array and having a gap from a mobile body surface; a radome disposed so as to cover the antenna adapter; a skirt to shield the gap between the mobile body surface and the antenna adapter from flowing outside air and to radiate heat from the antenna adapter; and a heat pipe including an evaporator and a condenser that condenses a working fluid vaporized in the evaporator, the heat pipe being disposed to extend from the antenna array toward the skirt.

Advantageous Effects of Invention

According to the present disclosure, even in the thin antenna device, the cooling performance capable of sufficiently cooling the antenna array can be ensured without maintenance.

DESCRIPTION OF EMBODIMENTS

First Embodiment

Figure 1:
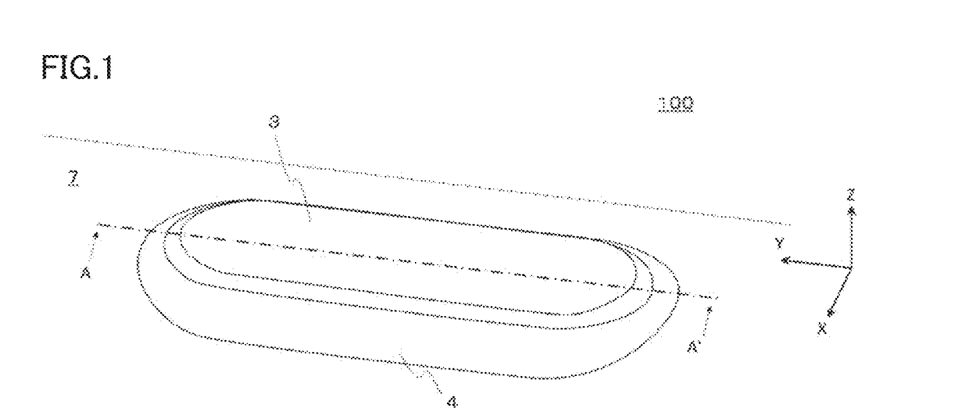
FIG. 1 is a perspective view illustrating an appearance of an antenna device according to a first embodiment.
Figure 2:
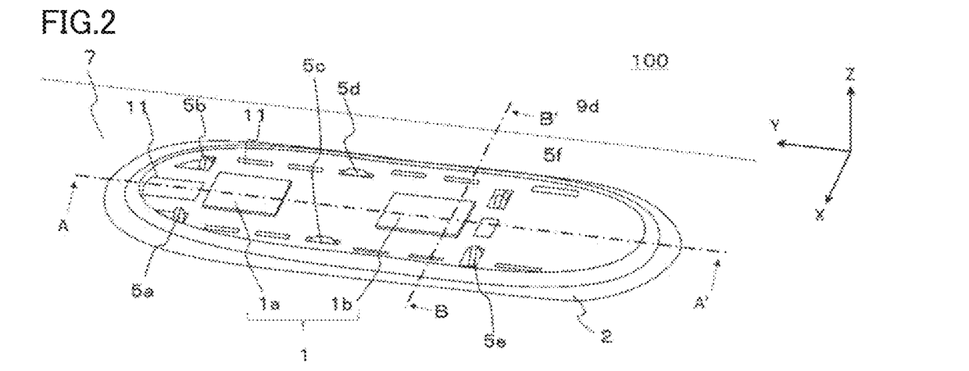
FIG. 2 is a perspective view illustrating an inside of the antenna device of the first embodiment.

FIG. 1 is a perspective view illustrating an appearance of an antenna device 100 according to a first embodiment. FIG. 2 is a perspective view illustrating an inside of antenna device 100 of the first embodiment. With reference to FIGS. 1 and 2, a configuration of antenna device 100 of the first embodiment will be described below.

As illustrated in FIG. 1, a surface of antenna device 100 is surrounded by a radome 3 and a skirt 4, and radome 3, skirt 4, and a mobile body surface 7 are in close contact with each other. For this reason, even when a mobile body moves at a high speed, a traveling wind does not enter the inside of antenna device 100.

As illustrated in FIG. 2, antenna device 100 includes an antenna array 1, an antenna adapter 2, radome 3, skirt 4, a power supply 6, and a control circuit 8. Antenna device 100 is attached to mobile body surface 7 of an aircraft or the like, and is used for communication using a satellite.

In the drawings, a direction orthogonal to mobile body surface 7 is a Z-axis, a traveling direction of the mobile body is a Y-axis, and a width direction of antenna device 100 orthogonal to the Z-axis and the Y-axis is an X-axis. In the following description, a positive direction of the Z-axis is referred to as "upper", a negative direction is referred to as "lower", a positive direction of the Y-axis is referred to as "front", and a negative direction of the Y-axis is referred to as "rear". The traveling direction of the mobile body corresponds to a direction in which the front portion to the rear portion of the mobile body are connected by a straight line, and for example, when the mobile body is the aircraft, the traveling direction of the mobile body corresponds to a direction from a nose to an empennage. The mobile body of the first embodiment will be described as the aircraft, and is merely an example, but the mobile body is not limited to the aircraft.

Figure 3:
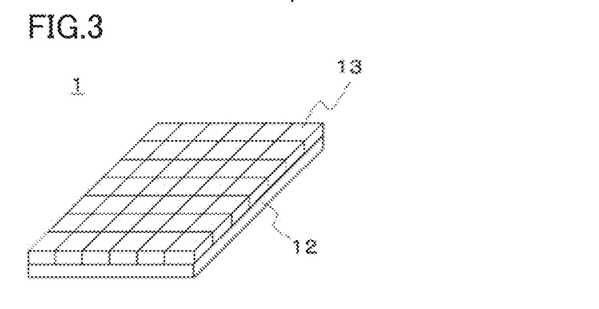
FIG. 3 is a perspective view illustrating an antenna array of the first embodiment.

Each component of antenna device 100 will be described. With reference to FIGS. 2 and 3, antenna array 1 will be described first. FIG. 3 is a schematic diagram illustrating antenna array 1 of the first embodiment.

Antenna array 1 is a flat plate-type communication module, and includes a transmitting antenna array 1a that transmits a radio wave to a communication target and a receiving antenna array 1b that receives the radio wave from the communication target. Transmitting antenna array 1a and receiving antenna array 1b are disposed in antenna adapter 2 at a distance. That is, antenna array 1 is held by antenna adapter 2. In antenna device 100 of the first embodiment, as illustrated in FIG. 2, receiving antenna array 1b is disposed on a −Y-axis side of transmitting antenna array 1a. However, the present invention is not limited thereto, and receiving antenna array 1b may be disposed on a +Y-axis side of transmitting antenna array 1a. Because transmitting antenna array 1a and receiving antenna array 1b generate heat by transmission or reception of the radio wave, transmitting antenna array 1a and receiving antenna array 1b are installed apart from each other.

As illustrated in FIG. 3, antenna array 1 includes a plurality of antenna elements 13 arrayed in a lattice shape and a communication IC 12 that causes antenna elements 13 to execute a predetermined operation. Antenna array 1 is an active type electronic scanning antenna array, and adjusts the directivity of the radio wave by controlling a phase shift amount of each antenna element 13 in order to track the satellite of a communication target.

Antenna elements 13 are arrayed on a wiring board (not illustrated), and transmit or receive the communication radio wave to or from a communication target. A radio frequency (RF) signal or the like is used for the communication radio wave. For this reason, antenna element 13 generates the heat when transmitting and receiving the radio wave to and from the communication target. Because the plurality of antenna elements 13 is arrayed in antenna array 1, there is a risk that the heat generation density of antenna array 1 increases due to the high integration of antenna elements 13.

The number of antenna elements 13 arrayed in antenna array 1 is determined by a scanning angle of the radio wave, an expected amount of loss of the radio wave, and the like. The distance between antenna elements 13 varies depending on a wavelength of the radio wave used for the communication. The shorter the wavelength of the radio wave used for the communication, the narrower the element interval of antenna element 13. For example, when the wavelength of the radio wave used for the communication is antenna element 13 of a Ka band, a size of antenna array 1 is about several tens of centimeters square.

Communication IC 12 is disposed such that a surface opposite to a surface in contact with a wiring board (not illustrated) on which antenna elements 13 are arrayed is set to a heat radiation surface, and such that the heat radiation surface is joined to the antenna adapter 2. Communication IC 12 includes electronic components such as a phase shifter that changes a phase of the RF signal transmitted and received by antenna element 13 and an amplifier that amplifies the RF signal. These electronic components are mounted on the wiring board, supplied with a necessary power supply voltage from power supply 6, and further supplied with a necessary control signal from control circuit 8, thereby executing a predetermined operation. Each electronic component of communication IC 12 generates the heat during operation.

The heat amount of communication IC 12 also varies depending on a semiconductor process of the electronic component. For example, in the case where the heat amount of communication IC 12 is in order of kilowatts, when thermal diffusion capability of antenna adapter 2 in contact with the heat radiation surface of communication IC 12 is low, the central portion of communication IC 12 having a flat plate shape cannot sufficiently radiate the heat. Because each electronic component included in communication IC 12 is a semiconductor element, the junction temperature needs to be maintained less than or equal to about 100° C. in order that communication IC 12 exhibits desired performance. The junction temperature is the maximum temperature at which the semiconductor element operates. For this reason, the good heat radiation performance of antenna adapter 2 serving as the heat radiation surface of communication IC 12 is required in order to operate communication IC 12.

With reference to FIG. 2, antenna adapter 2 will be described below. For example, antenna adapter 2 is a flat base material, and is horizontally disposed on an upper surface of the mobile body. Antenna adapter 2 is opposed to mobile body surface 7 with a gap therebetween. Accordingly, antenna adapter 2 includes a surface (+Z-axis side surface) on a side where antenna array 1 is arrayed and a surface (−Z-axis side surface) on a side opposed to mobile body surface 7, and power supply 6 that supplies power to antenna array 1 and control circuit 8 that transmits the control signal to antenna array 1 are disposed on the surface (−Z-axis side surface) opposed to mobile body surface 7, which are not illustrated here.

Power supply 6 converts a power supply voltage supplied from the inside of the mobile body into a voltage required by antenna array 1 and control circuit 8, and supplies the voltage. Power supply 6 includes a plurality of elements, and is fixed to antenna adapter 2. In power supply 6, the heat is generated according to the converted power.

Control circuit 8 is a circuit that controls antenna array 1. A plurality of electronic components are mounted on control circuit 8, and the heat is generated by operation.

A plurality of through-holes 11 penetrating the surface (+Z-axis side surface) on the side where antenna array 1 is arrayed and the surface (−Z-axis side surface) on the side opposed to mobile body surface 7 are provided in antenna adapter 2. The plurality of through-holes 11 have different sizes depending on roles, and are provided in many cases in order to reduce the weight of antenna adapter 2. Accordingly, it can also be said that antenna adapter 2 is a frame in which a plurality of holes are made in a flat plate. Brackets (not illustrated) to which mounting brackets 5a to 5f are fitted are provided in some through-holes 11 made in the outer periphery of antenna adapter 2.

When the mobile body moves at a high speed, a lift is generated in antenna device 100 due to the air resistance, so that antenna adapter 2 is fixed and supported by, for example, the plurality of mounting brackets 5a to 5d provided on mobile body surface 7. The force applied to each fixing portion of antenna adapter 2 by the lift is dispersed by fixing and supporting antenna adapter 2 at a plurality of positions. In addition, because antenna adapter 2 is fixed and supported on mobile body surface 7 by the plurality of mounting brackets 5a to 5d, there is a gap between antenna adapter 2 and mobile body surface 7. Furthermore, antenna adapter 2 also plays a role of securing rigidity such that entire antenna device 100 is not deformed by the lift.

Antenna adapter 2 is formed by cutting out a material having high thermal conductivity. For example, the material is a metal material such as aluminum. Accordingly, antenna adapter 2 serves as a heat radiation path for the heat generated by antenna array 1, power supply 6, control circuit 8, and the like.

Radome 3 is disposed so as to cover antenna adapter 2 and so as to have the gap from the surface (+Z-axis side surface) on the side where antenna array 1 is disposed of the antenna adapter 2, and plays a role of protecting antenna array 1 from disturbance such as wind and rain and dust. Radome 3 is continuously connected to skirt 4, and is fixed to the outer periphery of antenna adapter 2 using a plurality of screws. The shape of radome 3 is a streamline shape.

In addition, because antenna array 1 needs to transmit the radio wave transmitted to and received from the communication target, radome 3 is made of a material capable of transmitting the radio wave used for the communication. For this reason, for example, a material having a low dielectric constant and easily transmitting the radio wave such as a resin material is used for the material of radome 3.

With this configuration, the air resistance generated in antenna device 100 attached to mobile body surface 7 can be minimized even when the mobile body moves at a high speed.

Skirt 4 is a flat plate provided along the outer periphery of antenna adapter 2. As illustrated in FIG. 2, for example, when antenna adapter 2 has an elliptical shape, skirt 4 has a hollow elliptical frustum shape.

Skirt 4 includes one end connected to radome 3 while the other end connected to mobile body surface 7, so that skirt 4 plays a role of preventing the outside air from flowing into the gap between antenna adapter 2 and mobile body surface 7. For the connection between skirt 4 and mobile body surface 7, an elastic body 14 such as a rubber packing is attached such that skirt 4 is in close contact with mobile body surface 7. Skirt 4 is provided in close contact with mobile body surface 7, the outside air is prevented from flowing into the gap between antenna adapter 2 and mobile body surface 7 even when the mobile body expands due to pressurization or the like to bend mobile body surface 7.

When a temperature of the outside air is extremely lower than a temperature inside antenna device 100, or when humidity of the outside air is higher than humidity inside antenna device 100, condensation is generated inside antenna device 100. Accordingly, because skirt 4 is a member that connects radome 3 and mobile body surface 7, the outside air does not flow into the gap between antenna adapter 2 and mobile body surface 7, and the condensation generated inside antenna device 100 can be significantly reduced. At this point, the outside air is air outside the space sealed by radome 3, skirt 4, and mobile body surface 7, which are outer skins of antenna device 100. That is, the outside air points to the air outside antenna device 100.

As illustrated in FIG. 2, for example, radome 3 and skirt 4 have symmetrical outer shapes with respect to a center line A-A' direction connecting the front and the rear of the mobile body. In addition, preferably transmitting antenna array 1*a* and receiving antenna array 1*b* are arrayed on the surface of antenna adapter 2 so as to be positioned on the center line A-A'. This array enables aerodynamic symmetry. That is, when the mobile body is the aircraft, antenna device 100 can uniformly receive the dynamic influence of the traveling wind generated during the flight without bias in antenna device 100.

An example of a dimensional constraint and a coupling structure of antenna adapter 2 will be described below.

Antenna adapter 2 is a heat radiation surface of a heating element such as antenna element 13, and is made of the material having the high thermal conductivity, so that heat diffusion performance can be improved by increasing the thickness and the sectional area. That is, the heat radiation performance can be improved by enlarging the heat radiation surface.

On the other hand, the increase in the sectional area of antenna adapter 2 becomes the increase in the projection area of antenna device 100. The projection area is the sectional area of the mobile body when the mobile body is viewed from the front in the traveling direction. The increase in the projection area of antenna device 100 leads to the increase in the air resistance of the mobile body. The increase in the thickness of antenna adapter 2 also leads to the increase in the weight of antenna device 100. For this reason, the thickness and the sectional area of antenna adapter 2 need to be kept at the minimum required size.

The coupling structure between antenna adapter 2 and mobile body surface 7 is defined by, for example, ARINC791 that is one of an aircraft standard for a commercial aircraft.

Figures 4, 5:
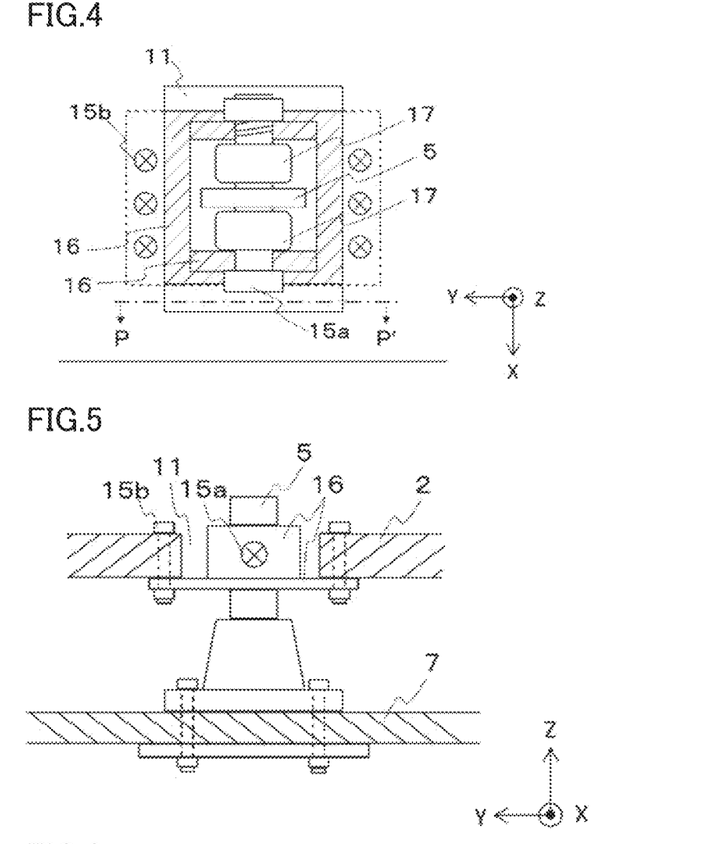
FIG. 4 is a view illustrating a coupling structure between an antenna adapter and a bracket of the first embodiment.
FIG. 5 is a view illustrating a part of the antenna device when viewed from a line P-P' in FIG. 4.

FIG. 4 is a plan view illustrating the coupling structure between mounting bracket 5 and antenna adapter 2 when the inside of radome 3 is viewed from above. FIG. 5 is an enlarged sectional view illustrating a part of antenna device 100 taken along a line P-P' in FIG. 4. As illustrated in FIGS. 4 and 5, mounting bracket 5 provided on mobile body surface 7 is coupled to antenna adapter 2 through a bolt 15*a* and a bracket 16. Accordingly, antenna adapter 2 can be easily removed from the mobile body, and inspection and replacement during failure are facilitated.

Bracket 16 is attached to a part of through-hole 11 of antenna adapter 2 using a bolt 15*b*. Bracket 16 and mounting bracket 5 are coupled using bolts 15*a*. In addition, a cushioning material 17 such as a rubber bush is interposed between mounting bracket 5 and bracket 16, and plays a role of absorbing stress generated by a change even when the position of mounting bracket 5 changes due to the pressurization in the mobile body. In the aircraft standards (ARINC791, ARINC792, and the like), antenna adapter 2 and mobile body surface 7 are specified to secure the interval greater than or equal to 8 mm.

When the mobile body flies, antenna device 100 also needs a structure in preparation for a lightning strike. Sometimes a structure that allows a current to flow during the lightning strike is provided in the surface of radome 3, but there is a possibility to generate dielectric breakdown due to discharge when the distance between the inner wall of radome 3 and antenna element 13 is too small. Accordingly, preferably antenna adapter 2 and mobile body surface 7 have a gap of about 10 and several millimeters.

In order to reduce a projection plane height of antenna device 100 to, for example, about 5 centimeters while these structural constraints are satisfied, the thickness of antenna adapter 2 is preferably less than or equal to about 2 centimeters. The size of antenna adapter 2 serving as the base material of antenna array 1 or the like varies depending on the size of a mounted device, but in the antenna for the Ka band defined by ARINC791, the size exceeds 2 square meters.

Cooling of antenna device 100 of the first embodiment will be described below.

In antenna device 100 of the first embodiment, antenna array 1, power supply 6, and control circuit 8 that are installed in antenna adapter 2 serve as heating elements. In particular, antenna array 1 is a main heat source, and communication IC 12 of antenna array 1 needs to maintain the junction temperature at less than or equal to about 100° C. For this reason, the heat radiation performance of antenna adapter 2 in which communication IC 12 is installed needs to be improved in order to operate antenna device 100.

In the mobile body, the traveling air (outside air) obtained by the movement can be used for cooling antenna device 100. However, when the heating element is not set on the surface of antenna device 100 in contact with the traveling wind, it is difficult to directly cool the antenna device 100 with the traveling wind. Consequently, in antenna device 100 attached to the mobile body, when a radiator is provided in a peripheral portion of antenna device 100, the heat can be radiated from the radiator through antenna adapter 2. Thus, even when the heating element is not installed on the surface of antenna device 100 in contact with the outside air, antenna device 100 can be cooled.

The larger the surface area of the radiator that exchanges the heat with the outside air, the higher cooling efficiency. In antenna device 100, for example, it is conceivable to dispose the radiator in which a fin is provided around antenna device 100. On the other hand, when the moving object is the aircraft, the structure such as the fin has a high risk of being broken by an external factor such as a bird strike. In addition, an outside air temperature is low and the condensation or the like is easily generated in midair where the aircraft flies, so that there is a possibility that an air path between the fins is blocked to reduce the heat exchange efficiency. The decrease in the heat exchange efficiency due to the external factor or the condensation degrades cooling performance of antenna device 100. In addition, when the radiator has a shape protruding from mobile body surface 7, a pressure loss may be aerodynamically increased. Accordingly, the radiator of the antenna device attached to the mobile body is desirably a smooth flat plate.

As the radiator capable of minimizing the air resistance received by the aircraft from the traveling wind generated during flight, skirt 4 disposed around antenna adapter 2 is used as a radiator. That is, the heat from antenna adapter 2 is radiated by skirt 4.

However, skirt 4 is a metal flat plate, and there is a limit to heat flux (the amount of heat that can cross a unit area equivalent per unit time) obtained between skirt 4 and the outside air. For this reason, in order to obtain the high heat radiation performance in skirt 4, the heat transmitted to skirt 4 needs to be previously diffused throughout skirt 4. On the other hand, the heating element installed in antenna device 100 diffuses the heat to skirt 4 through antenna adapter 2. Consequently, the heat can be diffused to entire skirt 4 disposed along the outer periphery of antenna adapter 2 by improving capability to diffuse the heat of antenna adapter 2, namely, heat radiation capability of antenna adapter 2.

In order to improve the heat radiation capability of antenna adapter 2, the size of antenna adapter 2 is increased. However, when the size of antenna adapter 2 is restricted by the aircraft standard or the like, it is difficult to increase the thickness or the sectional area of antenna adapter 2, and there is a possibility that the heat cannot be sufficiently diffused to skirt 4.

For example, when communication IC 12 of several tens of centimeters square generates the heat in the order of kilowatts in antenna adapter 2 having the thickness of about 2 centimeters, there is a possibility that the sufficient heat diffusion cannot be performed. When the heat cannot be sufficiently diffused to skirt 4, the temperature of the central portion of communication IC 12 cannot be lowered to less than or equal to 100° C., and there is a possibility that communication IC 12 does not perform the desired operation.

Even when the amount of heat generated by communication IC 12 is less than kilowatts, antenna adapter 2 having the thickness of about 2 centimeters needs to reduce the thermal resistance to skirt 4 that is the heat radiation surface as much as possible.

As described above, most of the heat generated by the heating element of antenna device 100 is transferred through antenna adapter 2 and dissipated to the outside air with skirt 4 as the heat radiation surface. However, when the thickness of the antenna adapter 2 is thin, there is a possibility that the sufficient heat radiation cannot be secured. In particular, antenna array 1 disposed in the center portion of antenna adapter 2 has few effective heat radiation paths because other heating elements are disposed around antenna array 1, and the heat is confined.

In antenna device 100 of the first embodiment, a heat pipe 9 having high heat transport capability is provided in antenna adapter 2.

Heat pipe 9 of the first embodiment will be described below.

Figure 6:
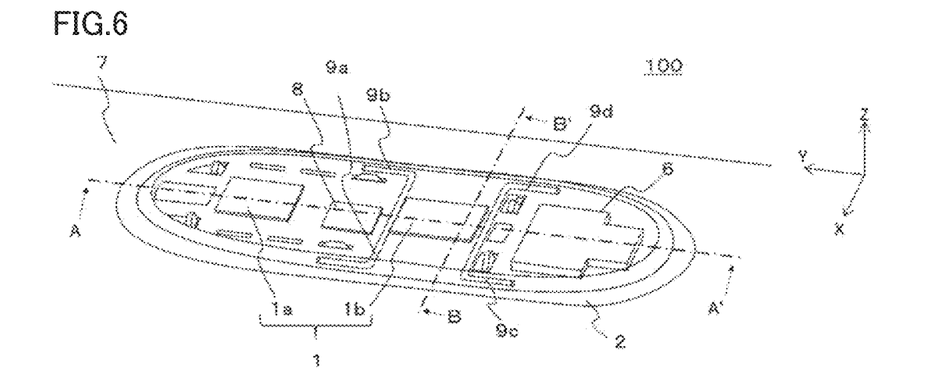
FIG. 6 is a perspective view illustrating disposition of a heat pipe of the first embodiment.
Figure 7:
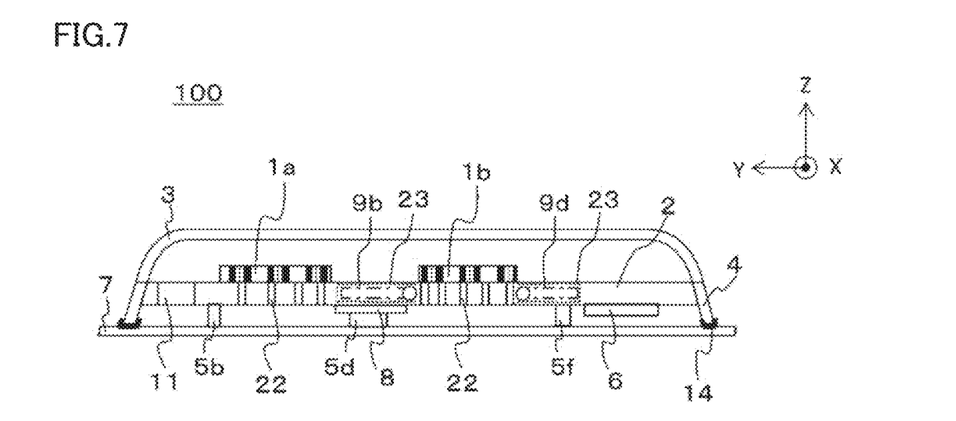
FIG. 7 is a view of the antenna device taken along line A-A' in FIG. 6.
Figure 8:
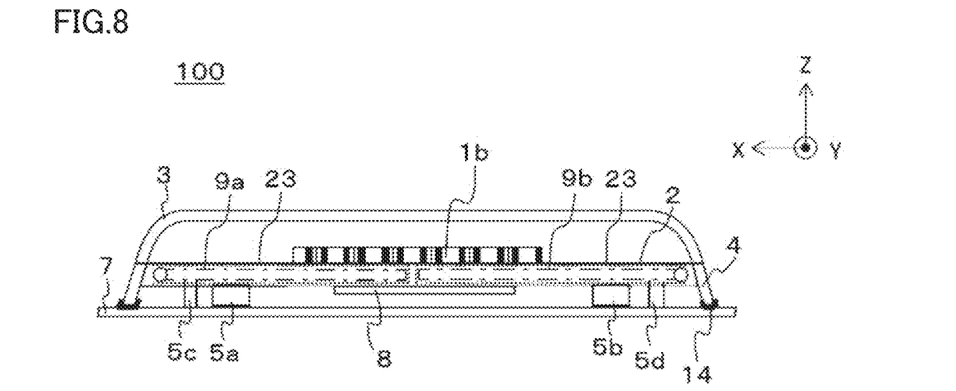
FIG. 8 is a view of the antenna device taken along line B-B' in FIG. 6.

With reference to FIGS. 6, 7, and 8, the disposition of heat pipes 9 will be described. FIG. 6 is a perspective view illustrating antenna device 100 in FIG. 2 while antenna adapter 2 is transparent. Furthermore, FIG. 7 is a sectional view illustrating a section taken along line A-A' of antenna device 100 in FIG. 6, and FIG. 8 is a sectional view illustrating a section taken along line B-B' of antenna device 100 in FIG. 6.

Although not illustrated, control circuit 8, power supply 6, and antenna array 1 are connected by electric wiring. As illustrated in FIG. 7, because control circuit 8, power supply 6, and antenna array 1 are disposed on the opposed surfaces (the +Z-axis side surface and the −Z-axis side surface) of antenna adapter 2, a plurality of wiring through-holes 22 connecting the +Z-axis side surface and the −Z-axis side surface to pass the electric wiring are provided in a portion of antenna adapter 2 where antenna array 1 is joined. Accordingly, heat pipes 9 (9a to 9d) are disposed in antenna adapter 2 so as to surround antenna array 1 and so as not to interfere with wiring through-holes 22 (FIG. 6). Heat pipe 9 may be disposed only on one of antenna arrays 1 having the high heat generation density in antenna arrays 1 provided in antenna adapter 2. FIG. 6 illustrates an example in which heat pipes 9 are disposed so as to sandwich receiving antenna array 1b, but the disposition example is not limited thereto.

At this point, each of heat pipes 9 (9a to 9d) includes a bent portion, and has an L-shape or the like. However, heat pipes 9 (9a to 9d) are not limited to the L-shape as long as heat pipes 9 (9a to 9d) have the bent portion.

Although details of heat pipes 9 (9a to 9d) will be described later, heat pipes 9 (9a to 9d) are formed by enclosing a volatile working fluid in a pipe made of a material such as copper or a copper alloy having high thermal conductivity, and include an evaporator 20 that vaporizes the working fluid by the heat of the heating element and a condenser 21 that condenses the vaporized working fluid. The working fluid becomes vapor in evaporator 20 and moves to condenser 21 to be condensed, so that the heat can be efficiently moved. The condensed liquid returns to the evaporator 20 again.

Heat pipes 9 (9a to 9d) are disposed to extend from antenna array 1 toward skirt 4 such that the evaporator 20 of the heat pipe 9 faces on the side of antenna array 1 and such that condenser 21 faces on the side of skirt 4. In FIG. 6, each of heat pipes 9 (9a to 9d) is disposed such that evaporator 20 is faces on the X-axis direction along receiving antenna array 1b and such that condenser 21 that emits the heat faces on the Y-axis direction along skirt 4 disposed adjacent to the outer periphery of antenna adapter 2. Furthermore, evaporator 20 is preferably disposed in a direction perpendicular to the traveling direction of the mobile body, and condenser 21 is preferably disposed along the traveling direction of the mobile body. In FIG. 6, heat pipes 9a and 9b are disposed such that condenser ends of the heat pipes face on the +Y-axis direction, and heat pipes 9c and 9d are disposed such that the condenser ends of the heat pipes face on the −Y-axis direction. Disposing condenser 21 along the traveling direction of the mobile body includes disposing the condenser 21 in the direction parallel to the traveling direction of the mobile body or disposing condenser 21 at an angle inclined with respect to the traveling direction of the mobile body.

In order to reduce the air resistance, antenna device 100 is preferably low in the height direction, and is desired to be lightweight. Although antenna adapter 2 is required to have sufficient strength to withstand the lift received during the flight, heat pipes 9 (9a to 9d) can be disposed on the surface of antenna adapter 2 when the thickness of antenna adapter 2 is about 2 centimeters. However, considering that the communication radio wave between antenna array 1 and the satellite of the communication target is not shielded, and that the electric wiring and insulation between devices are not hindered, it is desirable to dispose heat pipes 9 (9a to 9d) inside antenna adapter 2 (FIGS. 7 and 8). FIGS. 7 and 8 illustrate an example in which heat pipes 9 (9a to 9d) are disposed inside antenna adapter 2 and within the thickness of antenna adapter 2. In order to dispose heat pipes 9 (9a to 9d) inside antenna adapter 2, it is conceivable that a groove 23 is provided in antenna adapter 2 and that heat pipes 9 (9a to 9d) are disposed along groove 23.

Figure 9:
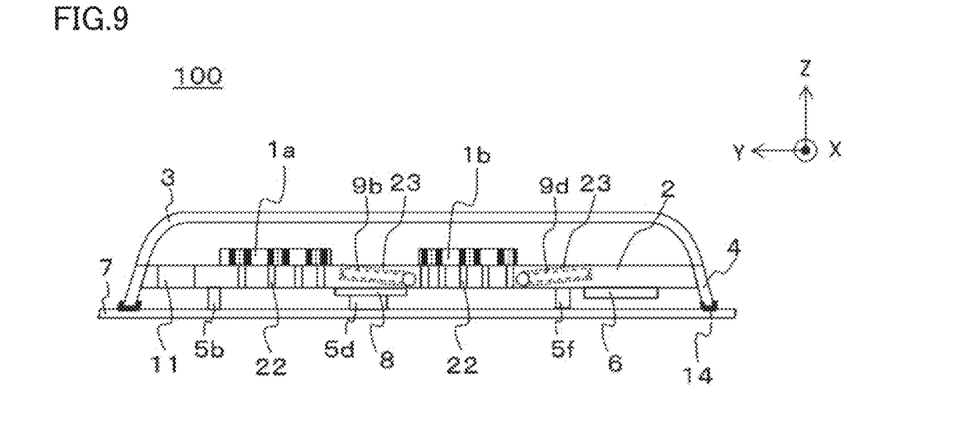
FIG. 9 is a view illustrating the antenna device taken along line A-A' in FIG. 6 when the heat pipe of the first embodiment is installed in an inclined manner.

Although the example in which heat pipes 9 (9a to 9d) are disposed inside antenna adapter 2 along the plane of antenna adapter 2 has been described, heat pipes 9 (9a to 9d) may be disposed in an inclined manner within a range falling within the thickness of antenna adapter 2. For example, as illustrated in FIG. 9, the ends of heat pipes 9a and 9b where condensers 21 are located are inclined in the +Z-direction until the ends fall within the thickness of antenna adapter 2, and the portions of heat pipes 9a and 9b where evaporators 20 are located are inclined in the −Z-direction until the ends fall within the thickness of antenna adapter 2. Similarly, the ends of heat pipes 9c and 9d where condensers 21 are located are inclined in the +Z-direction until the ends fall within the thickness of antenna adapter 2, and the portions of the heat pipe 9a and 9b where the evaporators 20 are located are inclined in the −Z-direction until the ends fall within the thickness of antenna adapter 2 (FIG. 9). That is, condenser 21 of heat pipe 9 (9a to 9d) may be disposed above evaporator 20.

In addition, the heat transport efficiency is improved when the evaporator of heat pipe 9 (9a to 9d) is disposed near antenna array 1 that is the heating element. Because the plurality of wiring through-holes 22 connecting the +Z-axis side surface and the −Z-axis side surface of antenna adapter 2 are provided in antenna adapter 2 in the portion where antenna array 1 in order to pass the electric wiring, it is often difficult to dispose heat pipes 9 (9a to 9d) immediately below antenna array 1. For this reason, FIG. 6 illustrates an example in which heat pipes 9 (9a to 9d) are disposed along receiving antenna array 1b such that the thermal resistance with receiving antenna array 1b is minimized. When wiring through-holes 22 are concentrated in the central portion of receiving antenna array 1b, the evaporator of heat pipes 9 (9a to 9d) is desirably disposed immediately below receiving antenna array 1b.

Accordingly, an example in which heat pipes 9 (9a to 9d) are disposed inside antenna adapter 2 and directly below antenna array 1 is the most desirable arrangement. When heat pipes 9 (9a to 9d) are disposed in this manner, the heat transport efficiency from the heating element can be improved, and the heat radiation performance of antenna adapter 2 can be improved. As the heat radiation performance of antenna adapter 2 is improved, the heat can be efficiently released to the outside by skirt 4 serving as the radiator of antenna device 100.

Figure 10:
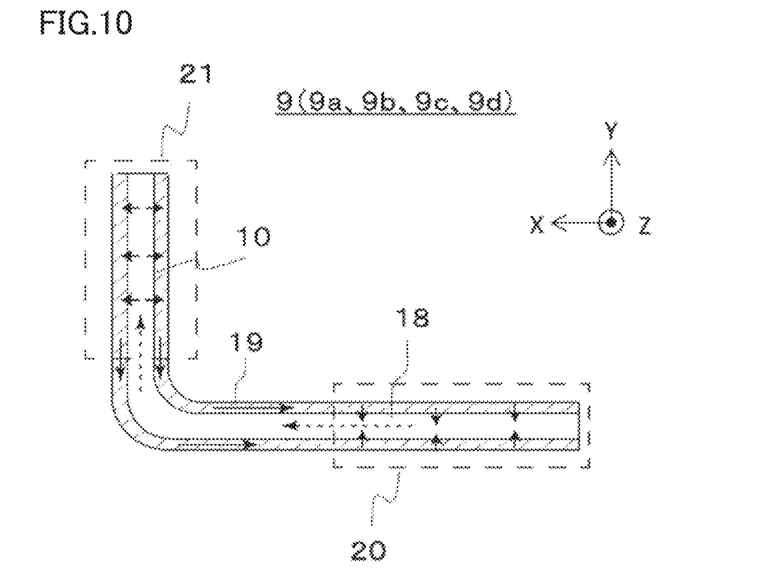
FIG. 10 is a sectional view of the heat pipe of the first embodiment.

A structure of heat pipe 9 and a cooling mechanism will be described below. FIG. 10 is a schematic sectional view of heat pipe 9 (9a to 9d). With reference to FIG. 10, the structure of heat pipe 9 and the cooling mechanism will be described. Heat pipes 9a to 9d are distinguished to describe the disposition of heat pipes 9, and are heat pipes 9 having the same structure as heat pipes 9.

Heat pipe 9 is what is called a wick type heat pipe 9, and a wick 10 is provided on a wall surface of the pipe. Wick 10 has a capillary structure, and can return the working fluid liquefied in condenser 21 to evaporator 20 using a capillary phenomenon of liquid.

The working fluid is sealed inside heat pipe 9. Because the heat transport capacity of the working fluid is higher as latent heat of vaporization of the working fluid is larger, water is generally often used. However, the water freezes below freezing. For this reason, in the case where the water is used as the working fluid, when the temperature of heat pipe 9 becomes below the freezing point, there is a risk that the water may dew and expand to damage heat pipe 9.

Antenna device 100 is exposed to outside air at about 50° C. below freezing in the sky when being mounted on the aircraft. Accordingly, sometimes heat pipe 9 is cooled to below freezing when antenna array 1 does not generate the heat. For this reason, when the water is used as the working fluid, a heating device such as a heater may be attached around heat pipe 9. When the temperature of the environment in which heat pipe 9 is used is below the freezing point, a liquid containing such as ammonia or ethanol that does not freeze even below the freezing point may be used as the working fluid. That is, in the environment where antenna device 100 is used, a liquid that is not frozen may be used as the working fluid.

Consequently, in the case of antenna device 100 attached to the aircraft, because antenna device 100 is predicted to be used in a low temperature environment during the flight, the liquid that does not freeze in a use environment is desirably used for the working fluid of heat pipe 9.

The working fluid sealed in heat pipe 9 is vaporized by receiving the heat in evaporator 20. Because the pressure in the vicinity of evaporator 20 is increased by vaporized working fluid 18, vaporized working fluid 18 is conveyed to condenser 21 having a relatively low pressure (broken-line arrow in FIG. 10). Condenser 21 is disposed closer to the outside air than the evaporator 20, and is cooled by the outside air. Therefore, vaporized working fluid 18 (broken-line arrow in FIG. 10) moving from evaporator 20 is cooled and liquefied in condenser 21. Working fluid 19 (solid-line arrow in FIG. 10) liquefied in condenser 21 is taken into wick 10 disposed on the inner wall of heat pipe 9. Liquefied working fluid 19 (solid-line arrow in FIG. 10) taken into wick 10 is diffused by capillary force of wick 10 and refluxed to evaporator 20 having relatively lower capillary force than condenser 21. Hereinafter, working fluid 19 liquefied in heat pipe 9 is vaporized in evaporator 20, carried to condenser 21, liquefied by condenser 21, and returned to evaporator 20, which is referred to as a reflux cycle.

As described above, heat pipe 9 can transport the heat using the temperature around heat pipe 9. Therefore, using heat pipe 9, the heat can be transported without requiring a pump requiring maintenance.

In antenna device 100 of the first embodiment, heat pipes 9 are disposed to extend from antenna array 1 toward skirt 4. That is, evaporator 20 of heat pipe 9 is disposed near antenna array 1 that is the heating element, and condenser 21 of heat pipe 9 is disposed near skirt 4 that exchanges the heat with the outside air. Thus, the working fluid of heat pipe 9 receives the heat from antenna array 1, and the working fluid of heat pipe 9 is vaporized. Vaporized working fluid 18 is conveyed to condenser 21 having the temperature lower than that of evaporator 20, and liquefied in condenser 21. Liquefied working fluid 19 returns to evaporator 20 by the capillary force of wick 10 provided on the wall surface of heat pipe 9. Heat pipe 9 conveys the heat of the heating element from the central portion of antenna adapter 2 to the outer periphery where skirt 4 is provided, which leads to the improvement in the heat radiation performance of antenna adapter 2. That is, the heat diffusion efficiency of antenna adapter 2 can be improved by providing heat pipes 9.

In addition, in antenna device 100 of the first embodiment, heat pipes 9 are disposed along grooves 23 provided in antenna adapter 2, so that the heat from the heating element can be diffused toward entire skirt 4 without increasing the size of antenna adapter 2.

Accordingly, when heat pipe 9 is provided in antenna device 100, the heat of antenna adapter 2 can be carried to skirt 4 without increasing the size of antenna adapter 2 and without maintenance. That is, when the heat radiation performance of antenna adapter 2 is improved, the heat can be diffused to entire skirt 4 to improve the cooling of antenna device 100.

The heat transport capacity of heat pipe 9 of the first embodiment will be described below.

Normally, in heat transport of heat pipe 9, reflux performance (wick limit) of liquefied working fluid 19 due to capillary force becomes a bottleneck. A maximum heat transport amount Q of heat pipe 9 is represented by an equation (1).

[Mathematical Formula 1]

$$Q = M \cdot \frac{K}{r_c} \cdot \frac{A_w}{l_{\mathit{eff}}} \cdot \left(2 + \frac{r_c \rho_l g}{\sigma} \sin \beta \right) \quad (1)$$

Where, M is a term that depends on a characteristic of the working fluid called a merit number. The second term on the right side is a term depending on a wick characteristic, K is an osmotic pressure coefficient of the wick, and $r_c$ is a wick radius. The third term on the right side is a term depending on the dimension, $A_w$ is the sectional area of the wick, and $l_{\mathit{eff}}$ is an effective length of heat pipe 9. The fourth item is a term depending on volume force, g is gravitational acceleration, σ is surface tension, p$\rho_l$ is the density, and β is the inclination of heat pipe 9.

In heat pipe 9, when the reflux cycle of the working fluid is operated, the heat transport capacity is very high, the latent heat amount is also large, and heat conduction performance that is one to two orders of magnitude higher than the heat conductivity of aluminum or copper known as a good heat conductor can be obtained when the water that exhibits the heat transport capacity most in the normal temperature range is used as the working fluid. Even when ethanol, which is a liquid that does not freeze even below the freezing point, is used as the working fluid, the thermal conduction performance higher than the thermal conductivity of aluminum or copper known as a good heat conductor can be obtained.

For example, assuming that the equivalent thermal conductivity of heat pipes 9 installed in antenna device 100 is about 5000 W/mK, the thermal resistance between receiving antenna array 1*b* and skirt 4 can be decreased by about 30% using about four heat pipes 9. Consequently, when flight altitude of the aircraft is low and the outside air temperature is high, the temperature at the central portion of receiving antenna array 1*b* can be maintained less than or equal to a target value even when there is heat generation of a kilowatt class.

When the number of heat pipes 9 disposed in antenna adapter 2 is increased greater than 4, the temperature of the device can be kept lower. However, in antenna device 100 installed in the aircraft, there is a limited installation space for heat pipes 9, and the cost increases as the number of heat pipes 9 increases. For this reason, the maximum heat radiation performance is required to be achieved with the limited number of heat pipes 9.

On the other hand, in heat pipe 9, when the reflux cycle of the working fluid is delayed and when liquefied working fluid 19 does not return to the evaporator 20, namely, when heat pipe 9 is in what is called a dry-out state, heat conduction becomes only conduction of the pipe member of heat pipe 9, so that sometimes the heat transport capability is rapidly decreased. A phenomenon that the volume force (apparent weight) applied to liquefied working fluid 19 cancels the capillary force can be cited as a factor that hinders the reflux of liquefied working fluid 19.

For example, it is assumed that a linear heat pipe is installed along the direction of gravity (not illustrated). In the case of bottom heat in which the condenser of the heat pipe is located higher than the evaporator in the direction of gravity, the volume force due to the gravity acts on assisting the reflux. On the other hand, in the case of top heat in which the condenser is located lower than the evaporator in the direction of gravity, the volume force due to the gravity acts in the direction against the capillary force of wick 10, and hinders the reflux of the working fluid. The prevention of the reflux of the working fluid in this manner may cause the dry-out state. Depending on the structure of the heat pipe, when acceleration of about 1 G (=9.81 m/s²) is applied in the direction that hinders the reflux of the liquefied working fluid, there is a very high possibility that the dry-out is generated.

At this point, the case where antenna device 100 in which heat pipes 9 is provided as illustrated in FIG. 6 is mounted on the aircraft is considered. Because the satellite communication antenna of the aircraft is mainly used for in-flight entertainment, the satellite communication antenna is rarely used at the time of taking off and landing, and generally operates at the time of cruising in the sky. Strictly speaking, the aircraft flies with the nose raised by about 3 degrees even during cruise in midair, but for the sake of simplicity, it is assumed that an airframe of the aircraft is parallel to the XY-plane (angle of attack is 0 degrees). At this time, the gravity direction when the aircraft is cruising (horizontal inertial flight) is considered to be the −Z-axis direction.

When the aircraft is in horizontal inertial flight, liquefied working fluid 19 is not affected by the volume force as long as heat pipes 9 (9*a* to 9*d*) are disposed in the XY-plane, so that liquefied working fluid 19 is refluxed by the capillary force. Therefore, all the heat pipes 9 (9*a* to 9*d*) can exhibit the expected heat transport capability.

On the other hand, when the aircraft is accelerating and decelerating, or when the nose is greatly raised (when an elevation angle of the airframe is large), the volume force is generated in liquefied working fluid 19 of heat pipes 9 (9*a* to 9*d*). In particular, the large acceleration is applied in the Y-axis direction during the acceleration and the deceleration. The acceleration is applied in the −Y-axis direction during the acceleration, and the acceleration is applied in the +Y-axis direction during the deceleration.

The acceleration exceeds 1 G in the mobile body such as a fighter or a racing car in which high acceleration performance is required, but the acceleration of about 0.5 G is generated even in the mobile body such as a passenger aircraft in which comfort is required. That is, during the acceleration and the deceleration of the mobile body, there is a high possibility that the dry-out is generated depending on the disposition direction of heat pipes 9 (9*a* to 9*d*).

When all four heat pipes 9 (9*a* to 9*d*) installed in antenna adapter 2 dry out during the acceleration and the deceleration of the aircraft, the temperature of antenna array 1 starts to rise. In general, the time during which the acceleration and the deceleration are performed in the mobile body is several seconds to several minutes at the longest, and the temperature of antenna array 1 rapidly rises during that time, and there is a possibility that a life of the device is reduced or a failure is generated when the junction temperature exceeds an allowable value.

Accordingly, in antenna device 100 of the first embodiment, heat pipes 9 (9*a* to 9*d*) include bent portions as illustrated in FIG. 6. In FIG. 6, evaporator 20 is disposed along receiving antenna array 1*b* so as to face on the X-axis direction, and condenser 21 is disposed along skirt 4 so as to face on the Y-axis direction. More specifically, heat pipes 9*a* and 9*b* are disposed such that evaporator 20 faces the X-axis direction and condenser 21 faces on the +Y-axis direction. Heat pipes 9*c* and 9*d* are disposed such that evaporator 20 faces the X-axis direction and condenser 21 faces on the −Y-axis direction. That is, condensers 21 of the heat pipes 9 (9*a* to 9*d*) are disposed in the direction (Y-axis direction) parallel to the traveling direction (+Y-axis direction) of the mobile body, and evaporators 20 are disposed in the direction (X-axis direction) perpendicular to the traveling direction (+Y-axis direction) of the mobile body. At least one heat pipe 9 (9a, 9b) of heat pipes 9 (9a to 9d) includes condenser 21 provided to be bent in the same direction (+Y-axis direction) as the traveling direction (+Y-axis direction) of the mobile body, and at least one heat pipe 9 (9c, 9d) of heat pipes 9 (9a to 9d) includes condenser 21 provided to be bent in the direction (−Y-axis direction) opposite to the traveling direction (+Y-axis direction) of the mobile body. In FIG. 6, heat pipes 9a and 9b correspond to the first heat pipe, and the heat pipes 9c and 9d correspond to the second heat pipe.

The case where the aircraft on which antenna device 100 in which heat pipes 9 (9a to 9d) are disposed is mounted as illustrated in FIG. 6 accelerates will be described. When the aircraft accelerates, the acceleration is generated in the −Y-direction. For this reason, the working fluid is not affected by the volume force in the member of evaporator 20 of heat pipe 9 (9a to 9d) facing in the X-axis direction. That is, in heat pipe 9 (9a to 9d) including the bent portion, the portion disposed in the direction (X-axis direction) perpendicular to the traveling direction (+Y-axis direction) of the mobile body is not affected by the volume force during the acceleration.

On the other hand, the member of heat pipe 9 (9a to 9d) facing the Y-axis direction may be affected by the volume force depending on the direction in which the acceleration is generated and the reflux direction of the working fluid. In heat pipe 9 (9a to 9d) including the bent portion, there is a possibility that the portion disposed in the direction (Y-axis direction) parallel to the traveling direction (+Y-axis direction) of the mobile body is affected by the volume force during the acceleration.

Like condenser 21 of heat pipes 9c and 9d, when the acceleration is generated in the −Y-direction and the working fluid refluxes in the +Y-direction, namely, when the generation direction of the acceleration and the reflux direction of the working fluid are opposite to each other, the reflux of the working fluid is temporarily prevented by the volume force. On the other hand, like condenser 21 of the heat pipes 9a and 9b, when the acceleration is generated in the −Y-direction and the working fluid refluxes in the −Y-direction, namely, when the generation direction of the acceleration and the reflux direction of the working fluid are the same direction, the volume force promotes the reflux of the working fluid. Although the reflux of heat pipes 9c and 9d is temporarily prevented by the volume force, the reflux is promoted by the volume force in heat pipes 9a and 9b, so that the heat radiation performance of entire heat pipe 9 (9a to 9d) is not degraded.

Accordingly, in antenna device 100 in which heat pipes 9 (9a to 9d) are disposed as illustrated in FIG. 6, at least two heat pipes 9 continue to operate even when the mobile body accelerates, so that receiving antenna array 1b does not cause a rapid temperature rise in which the junction temperature exceeds the specified value in a short time. That is, heat pipe 9 does not dry out even at the time of the acceleration, and the heat of antenna adapter 2 can be continuously radiated to skirt 4.

In addition, the case where the aircraft on which antenna device 100 in which heat pipes 9 (9a to 9d) are disposed is mounted as illustrated in FIG. 6 decelerates will be described. When the aircraft decelerates, the acceleration is generated in the +Y-direction. For this reason, the working fluid is not affected by the volume force in the member of heat pipe 9 (9a to 9d) facing in the X-axis direction. That is, the working fluid in evaporator 20 of heat pipes 9 (9a to 9d) disposed so as to face on the X axis direction is not affected by the volume force. In other words, in heat pipe 9 including the bent portion, the portion disposed in the direction (+X-axis direction) perpendicular to the traveling direction (+Y-axis direction) of the mobile body is not affected by the volume force even at the time of the deceleration.

On the other hand, the member of heat pipe 9 (9a to 9d) facing the Y-axis direction may be affected by the volume force depending on the direction in which the acceleration is generated and the reflux direction of the working fluid. In heat pipe 9 (9a to 9d) including the bent portion, there is a possibility that the portion disposed in the direction (Y-axis direction) parallel to the traveling direction (+Y-axis direction) of the mobile body is affected by the volume force even at the time of the deceleration.

Like condenser 21 of heat pipes 9a and 9b, when the acceleration is generated in the +Y-direction and the working fluid refluxes in the −Y-direction, namely, when the generation direction of the acceleration and the reflux direction of the working fluid are opposite to each other, the reflux of the working fluid is temporarily prevented by the volume force. On the other hand, like condenser 21 of heat pipes 9c and 9d, when the acceleration is generated in the +Y-direction and the working refluxes in the +Y-direction, namely, when the generation direction of the acceleration and the reflux direction of the working fluid are the same direction, the volume force promotes the reflux of the working fluid. Although the reflux is temporarily prevented by the volume force in heat pipes 9a and 9b, the reflux is promoted by the volume force in heat pipes 9c and 9d, so that the heat radiation performance is not degraded.

Accordingly, in antenna device 100 in which heat pipes 9 (9a to 9d) are disposed as illustrated in FIG. 6, at least two heat pipes 9 continue to operate even when the mobile body decelerates, so that receiving antenna array 1b does not cause a rapid temperature rise in which the junction temperature exceeds the specified value in a short time. That is, heat pipe 9 does not dry out even at the time of the deceleration, and the heat of antenna adapter 2 can be continuously radiated to skirt 4.

As described above, in antenna device 100 of the first embodiment, heat pipes 9 (9a to 9d) including the bent portion in antenna adapter 2 are disposed to extend from antenna array 1 toward skirt 4, so that the heat radiation performance of antenna adapter 2 can be improved without requiring maintenance even in thin antenna device 100 and antenna array 1 can be sufficiently cooled.

That is, in antenna adapter 2, evaporator 20 of heat pipe 9 (9a to 9d) is disposed along receiving antenna array 1b in the X-axis direction, and condenser 21 is disposed along skirt 4 in the Y-axis direction, so that the heat can be efficiently transferred from antenna adapter 2 to skirt 4 without increasing the size of antenna adapter 2. As a result, the cooling performance of antenna device 100 can be improved.

The increase in size of antenna adapter 2 is not required, so that the present invention can also be applied to thin antenna device 100. In addition, antenna device 100 can be thinned, the weight is reduced, and the fuel consumption of the mobile body can also be improved.

In addition, the heat of antenna adapter 2 is efficiently transferred to skirt 4 that is the radiator, so that the heat can be radiated even when antenna array 1 or the like that is the heating element is installed in the central portion of antenna adapter 2. Even when the communication capacity increases to enhance the heat generation density in the central portion of antenna adapter 2, antenna array 1 can be cooled to the temperature at which antenna array 1 operates, so that antenna array 1 can be maintained less than or equal to a prescribed temperature.

Even when the heating element cannot directly exchange the heat with the outside air in thin antenna device 100, namely, even when the heating element is disposed in the central portion of antenna adapter 2, the cooling performance of antenna device 100 can be improved by adopting the configuration of the first embodiment.

Furthermore, when the mobile body is the aircraft, situations such as the cruise (horizontal inertial flight), the acceleration, and the deceleration are conceivable. However, the end of condenser 21 of at least one heat pipe 9 faces on the +Y-axis direction and the end of condenser 21 of at least one heat pipe 9 faces on the −Y-axis direction, whereby the cooling performance of antenna device 100 can be maintained. In addition, even when the mobile body accelerates or decelerates for a short time necessary for operation, heat pipes 9 mounted on antenna device 100 do not generate the dry-out, and antenna array 1 can be maintained less than or equal to a predetermined temperature. As a result, the cooling performance can be secured even while the mobile body is accelerating and decelerating, so that the communication service can be stably provided.

A modification of antenna device 100 of the first embodiment will be described below.

Figure 11:
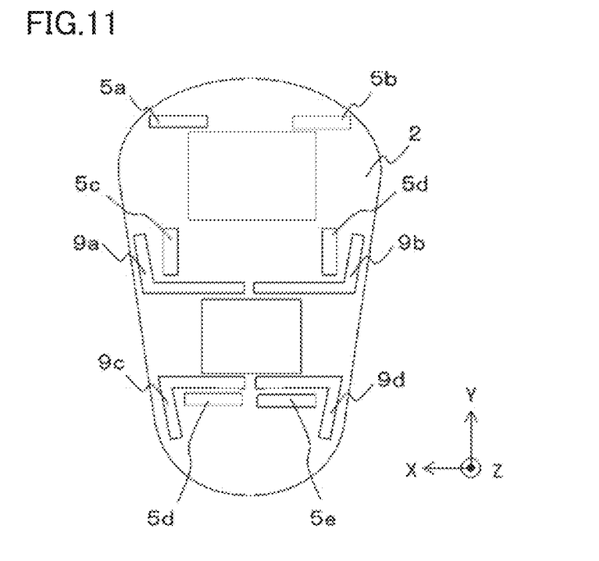
FIG. 11 is a sectional view illustrating a modification of the antenna device of the first embodiment.

FIG. 11 is a sectional view illustrating antenna device 100 of the modification of antenna device 100 of the first exemplary embodiment when viewed in the Z-axis direction. The modification of the present disclosure is obtained by modifying the shape of antenna adapter 2 and the shape of heat pipe 9 (9a to 9d) of the first embodiment.

In the first embodiment, antenna adapter 2 has an elliptical shape or an oval shape, and heat pipe 9 (9a to 9d) is bent by 90 degrees as an example. However, when antenna device 100 is mounted on the mobile body such as the aircraft in which the traveling direction is determined, there is also the case where the antenna device has, for example, a drop shape in which the rear of antenna adapter 2 is narrowed in order to further reduce the air resistance.

In such the case, when the side of condenser 21 of heat pipe 9 (9a to 9d) is disposed so as to be in contact with skirt 4, the side of condenser 21 of heat pipe 9 (9a to 9d) is not along the Y-axis direction, and the bending of heat pipe 9 takes an angle different from 90 degrees. However, when at least one of heat pipes 9 (9a to 9d) installed in antenna adapter 2 includes the end of condenser 21 facing on the +Y-axis direction, and when at least one heat pipe 9 includes the end of condenser 21 of heat pipe 9 facing on the −Y-axis direction, the same effects as those of antenna device 100 of the first embodiment can be obtained even when the shape of antenna adapter 2 of the first embodiment and the bending angle of heat pipe 9 are different.

In the description, it has been described that the ends of condenser 21 of the heat pipe 9 face on the +Y-axis direction in heat pipes 9a and 9b, and the ends of condenser 21 of the heat pipe 9 face on the −Y-axis direction in heat pipes 9c and 9d. However, when the length in the Y-axis direction of receiving antenna array 1b is sufficiently long, the same effect can be obtained even when heat pipes 9a and 9b are disposed such that the ends of condenser 21 of heat pipe 9 face on the −Y-axis direction, and even when heat pipes 9c and 9d are disposed such that the ends of condenser 21 of heat pipe 9 face on the +Y-axis direction.

Furthermore, although the description has been given assuming that the number of heat pipes 9 is 4, the number of heat pipes 9 may be increased when there is a margin in terms of cost, and heat pipes 9 may be disposed around transmitting antenna array 1a, control circuit 8, and the like mounted on antenna adapter 2 when there is a margin in installation space. When the number of heat pipes 9 to be installed is increased, not only the obtaining effects of antenna device 100 of the first embodiment but also the improvement in the cooling performance can be expected.

Second Embodiment

Figure 12:
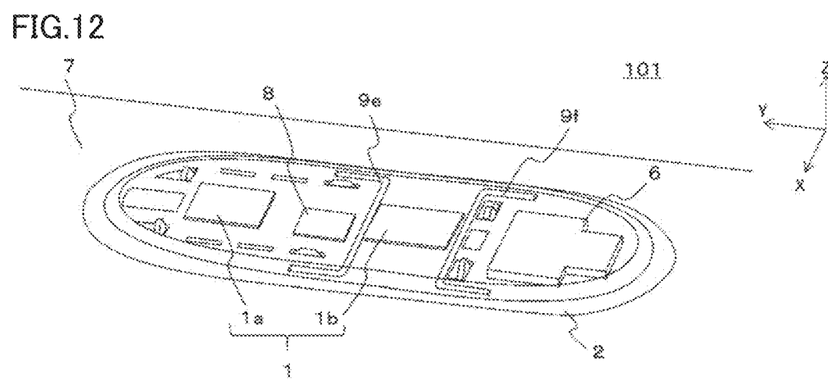
FIG. 12 is a perspective view illustrating a heat pipe according to a second embodiment.
Figure 13:
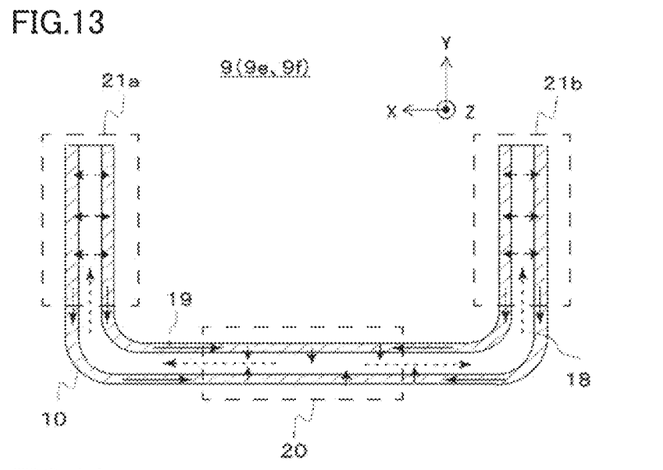
FIG. 13 is a sectional view illustrating the heat pipe of the second embodiment.

With reference to FIGS. 12 and 13, the antenna device 101 according to a second embodiment will be described below. In FIGS. 12 and 13, the same reference numerals as those in FIGS. 6 and 10 denote the same or corresponding parts. In the second embodiment, heat pipe 9 of antenna device 100 of the first embodiment has two bent portions. Hereinafter, heat pipe 9 of the second embodiment will be referred to as a U-shaped heat pipe. Description of the content overlapping the first embodiment will be omitted.

FIG. 13 is a perspective view illustrating disposition of U-shaped heat pipes 9 (9e, 9f) of antenna device 101 according to the second embodiment. With reference to FIG. 13, the disposition of U-shaped heat pipes 9 (9e, 9f) will be described. U-shaped heat pipes 9e and 9f include evaporator 20 at the central portion of heat pipe 9, and evaporator 20 is disposed along receiving antenna array 1b so as to face on the X-axis direction. Condensers 21a and 21b that release the heat are disposed on the outer periphery of antenna adapter 2 so as to face on the Y-axis direction along skirt 4 disposed adjacent to antenna adapter 2.

That is, condensers 21a and 21b of heat pipes 9 (9e, 9f) are disposed in the direction (Y-axis direction) parallel to the traveling direction (+Y-axis direction) of the mobile body, and evaporator 20 is disposed in the direction (X-axis direction) perpendicular to the traveling direction (+Y-axis direction) of the mobile body. At least one heat pipe 9 (9e) of heat pipes 9 (9e, 9f) includes condensers 21a and 21b provided to be bent in the same direction (+Y-axis direction) as the traveling direction (+Y-axis direction) of the mobile body, and at least one heat pipe 9 (9f) of heat pipes 9 (9e, 9f) includes condenser 21 provided to be bent in the direction (−Y-axis direction) opposite to the traveling direction (+Y-axis direction) of the mobile body. FIG. 13 is a sectional view illustrating a U-shaped heat pipe 9 (9e, 9f) of antenna device 101 of the second embodiment. With reference to FIG. 13, the structure and the cooling mechanism of U-shaped heat pipe 9 (9e, 9f) will be described. Heat pipes 9e and 9f are distinguished from each other in the description of the disposition of U-shaped heat pipes 9, and are heat pipes having the same structure as the heat pipes 9.

U-shaped heat pipe 9 (9e, 9f) includes two bent portions, includes evaporator 20 in the central portion, and includes condensers 21a and 21b on both end sides. U-shaped heat pipe 9 (9e, 9f) is formed by joining the ends of evaporators 20 of two L-shaped heat pipes 9 (FIG. 6). Consequently, U-shaped heat pipe 9 (9e, 9f) is different from L-shaped heat pipe 9 in including the two bent portions, but the other structures are the same as those of L-shaped heat pipe 9.

The working fluid sealed in U-shaped heat pipe 9 (9e, 9f) is vaporized by receiving the heat from receiving antenna array 1b at evaporator 20 provided in the central portion. Because the pressure near evaporator 20 is increased by vaporized working fluid 18, vaporized working fluid 18 separately moves to condensers 21a and 21b of U-shaped heat pipe 9 (9e, 9f) having a relatively low pressure (dashed-line arrows in FIG. 13). Condensers 21a and 21b are disposed on the outer periphery of antenna adapter 2 along skirt 4 disposed adjacent to antenna adapter 2, so that condensers 21a and 21b are cooled by the traveling air. Consequently, vaporized working fluid 18 (broken-line arrows in FIG. 13) moving from evaporator 20 is cooled and liquefied in condensers 21a and 21b. Working fluid 19 liquefied at the condensers 21a and 21b is taken into wick 10 disposed on the inner wall of U-shaped heat pipe 9 (9e, 9f) (solid-line arrow in FIG. 13). Liquefied working fluid 19 (solid-line arrows in FIG. 13) taken into wick 10 is diffused by the capillary force of wick 10 and flows to evaporator 20 having the relatively lower capillary force than condensers 21a and 21b.

In this manner, U-shaped heat pipe 9 (9e, 9f) can transport the heat by utilizing the temperature around U-shaped heat pipe 9 (9e, 9f). Consequently, using U-shaped heat pipe 9 (9e, 9f), the heat can be transported without requiring the pump requiring the maintenance.

The heat transport capability of heat pipe 9 of antenna device 100 according to the second embodiment will be described below.

When the mobile body is the aircraft, the airframe is tilted to obtain the bank angle during turning. When centrifugal force generated at this time and the aircraft weight are balanced with the lift, the apparent weight (volume force) is generated in the –Z-axis direction, so that the volume force that affects the capillary force of liquefied working fluid 19 is not generated.

However, when a special flight in which altitude is changed while turning, in other words, when turning is performed at a bank angle at which the centrifugal force, the airframe weight, and the lift are not balanced, the volume force is generated in the X-axis direction. When the volume force is generated in the +X-axis direction, in U-shaped heat pipe 9e, working fluid 19 liquefied in condenser 21a is prevented from returning to evaporator 20 by the volume force. However, because the volume force generated by working fluid 19 liquefied in condenser 21b acts in the direction in which the reflux is promoted, the heat transport capacity is improved as compared with the case where the volume force is not generated. Consequently, the heat radiation performance of U-shaped heat pipe 9 (9e, 9f) is not degraded even when acceleration occurs in the X-axis direction.

Accordingly, in antenna device 101 in which U-shaped heat pipes 9 (9e, 9f) are disposed as illustrated in FIG. 13, the heat radiation performance is not degraded even when the acceleration is generated in the X-axis direction.

The heat transport capability of U-shaped heat pipe 9 (9e, 9f) when the aircraft accelerates and decelerates will also be described.

In U-shaped heat pipe 9e, because condensers 21a and 21b face on the +Y-axis direction, when the acceleration is applied in the +Y-axis direction (during the deceleration), the capillary force of liquefied working fluid 19 is canceled by the volume force, so that the returning of the working fluid to evaporator 20 is temporarily prevented. On the other hand, in U-shaped heat pipe 9f disposed in a pair with U-shaped heat pipe 9e, because condensers 21a and 21b face on the –Y-axis direction, when the acceleration is applied in the +Y-axis direction (during the deceleration), the volume force generated in liquefied working fluid 19 acts in the direction in which the reflux is promoted, so that the heat transport capacity is improved as compared with the case where the volume force is not generated.

When the acceleration is applied in the –Y-axis direction (during the acceleration), the reflux of condensers 21a and 21b of U-shaped heat pipe 9f is temporarily prevented, but the reflux of condensers 21a and 21b of U-shaped heat pipe 9e is promoted, so that the heat transport capacity is improved as compared with the case where the volume force is not generated.

Therefore, in U-shaped heat pipes 9e and 9f, each condenser 21 is disposed along the mobile body traveling direction, condenser 21 of at least one heat pipe 9 is disposed in the same direction as the traveling direction of the mobile body, and condenser 21 of at least one heat pipe 9 is disposed in the direction opposite to the traveling direction of the mobile body, so that the heat radiation performance can be maintained even when the mobile body accelerates or decelerates.

Antenna device 101 of the second embodiment not only provides the same effects as antenna device 100 of the first exemplary embodiment, but also reduces the number of heat pipes 9 to be used as compared to antenna device 100 of the first exemplary embodiment, thereby contributing to weight reduction of antenna device 101. The weight of antenna device 101 can be reduced, so that the fuel consumption of the mobile body on which antenna device 101 is mounted can be reduced.

In addition, because at least one heat pipe 9 can operate with no problem even when the mobile body accelerates and decelerates, the time required for antenna element 13 used for antenna device 101 to exceed the specified temperature can be lengthened, and eventually, the usable state of antenna device 101 can be lengthened.

In the second embodiment, the description has been given assuming that the ends of condensers 21a and 21b of U-shaped heat pipe 9e face on the +Y-axis direction, and the ends of condensers 21a and 21b of U-shaped heat pipe 9f face on the –Y-axis direction. However, even when the ends of condensers 21a and 21b of U-shaped heat pipe 9e face on the –Y-axis direction, and even when the ends of condensers 21a and 21b of U-shaped heat pipe 9f face on the +Y-axis direction, the same effects as those of the first embodiment and the second embodiment can be obtained.

Third Embodiment

Figure 14:
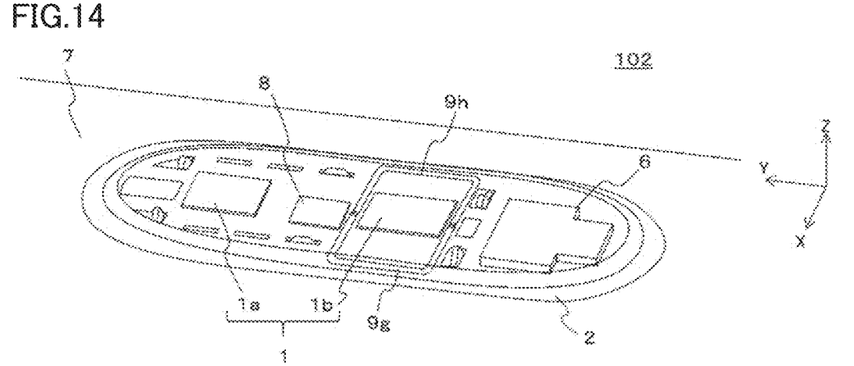
FIG. 14 is a perspective view illustrating a heat pipe according to a third embodiment.
Figure 15:
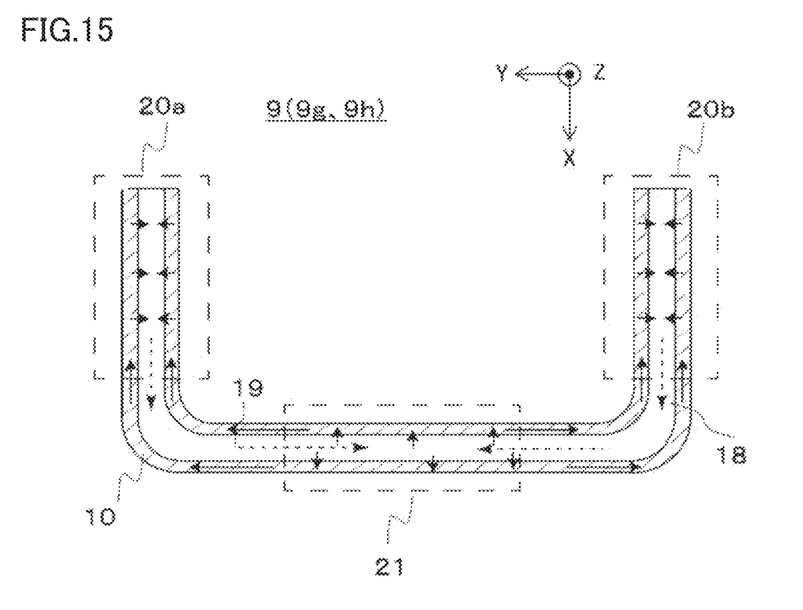
FIG. 15 is a sectional view illustrating the heat pipe of the third embodiment.

With reference to FIGS. 14 and 15, the configuration of an antenna device 102 according to a third embodiment will be described below. In FIGS. 14 and 15, the same reference numerals as those in FIGS. 6 and 10 denote the same or corresponding parts. Antenna device 102 of the third embodiment is different from antenna device 101 of the second embodiment in the disposition of heat pipes 9 (9g, 9h). Description of the content overlapping the first and second embodiments will be omitted.

FIG. 14 is a perspective view illustrating disposition of U-shaped heat pipes (9g, 9h) of antenna device 102 of the third exemplary embodiment. With reference to FIG. 14, the disposition of U-shaped heat pipes 9 (9g, 9h) will be described.

Evaporators 20a and 20b of U-shaped heat pipe 9 (9g, 9h) are located at both ends of heat pipe 9, and disposed near receiving antenna array 1b as the heating element. That is, evaporators 20a and 20b are provided on both end sides of heat pipe 9, and disposed so as to face on the X-axis direction along receiving antenna array 1b. Condenser 21 that emits the heat is disposed on the outer periphery of antenna adapter 2 so as to face on the Y-axis direction along skirt 4 disposed adjacent to antenna adapter 2.

Considering the disposition of the heat pipes 9 in consideration of only heat radiation, evaporators 20a and 20b of heat pipes 9 are preferably disposed immediately below receiving antenna array 1*b*. However, because the plurality of wiring through-holes 22 connecting the +Z-axis side surface and the −Z-axis side surface of antenna adapter 2 are provided in antenna adapter 2 in the portion where antenna array 1 in order to pass the electric wiring, it is often difficult to dispose heat pipes 9 immediately below antenna array 1. Accordingly, in FIG. 14, heat pipes 2*g* and 9*h* are disposed along the receiving antenna array 1*b* such that the thermal resistance with receiving antenna array 1*b* is minimized. However, when wiring through-holes 22 are concentrated in the central portion of receiving antenna array 1*b*, it goes without saying that the evaporators of heat pipes 9*g* and 9*h* are preferably disposed immediately below receiving antenna array 1*b*.

FIG. 15 is a sectional view illustrating U-shaped heat pipe 9 (9*g*, 9*h*) of antenna device 102 of the third embodiment. With reference to FIG. 15, the structure and the cooling mechanism of U-shaped heat pipe 9 (9*g*, 9*h*) will be described. Heat pipes 9*g* and 9*h* are distinguished from each other in the description of the disposition of U-shaped heat pipes 9, and are heat pipes having the same structure as heat pipes 9.

U-shaped heat pipe 9 (9*g*, 9*h*) has the same basic structure as U-shaped heat pipe 9 (9*e*, 9*f*) of the second embodiment. However, U-shaped heat pipe 9 is different from U-shaped heat pipe 9 in that condenser 21 is located at the center portion of U-shaped heat pipe 9, and that evaporators 20*a* and 20*b* are located at both ends of U-shaped heat pipe 9.

The working fluid sealed in U-shaped heat pipe 9 (9*g*, 9*h*) is vaporized by receiving the heat from receiving antenna array 1*b* at evaporators 20*a* and 20*b* provided on both end sides. Because the pressure in the vicinity of evaporators 20*a* and 20*b* increases due to vaporized working fluid 18, vaporized working fluid 18 is collected in condenser 21 of U-shaped heat pipe 9 (9*g*, 9*h*) having a relatively low pressure (dashed-line arrow in FIG. 15). Condenser 21 is disposed on the outer periphery of antenna adapter 2 along skirt 4 disposed adjacent to antenna adapter 2, so that condenser 21 is cooled by the traveling air. Consequently, vaporized working fluid 18 (broken-line arrows in FIG. 15) moving from evaporators 20*a* and 20*b* is cooled and liquefied in condenser 21. Working fluid 19 liquefied in condenser 21 is taken into wick 10 disposed on the inner wall of U-shaped heat pipe 9 (9*g*, 9*h*) (solid-line arrow in FIG. 15). Liquefied working fluid 19 (solid-line arrows in FIG. 15) taken into wick 10 is diffused by the capillary force of wick 10 and flows to the evaporators 20*a* and 20*b* having a relatively lower capillary pressure than the condenser 21.

As described above, heat pipe 9 can transport the heat using the temperature around heat pipe 9. Therefore, using heat pipe 9, the heat can be transported without requiring a pump requiring maintenance.

Antenna device 102 of the third embodiment not only can obtain the same effects as those of antenna device 100 of the first embodiment, but also is particularly effective when receiving antenna array 1*b* that is a main cooling target is long in the Y-axis direction. In the cooling using heat pipe 9, an appropriate area width is required for condenser 21 of heat pipe 9, and for example, about ⅓ to about ¼ of the entire length of heat pipe 9 is appropriate.

As described in the second embodiment, in the case where condenser 21 of heat pipe 9 disposed on the +Y-axis side of receiving antenna array 1*b* is bent and disposed on the +Y-axis side (FIG. 12), there is a possibility of spatial interference when heat radiating means such as the heat pipe is separately provided in order to cool transmitting antenna array 1*a* or control circuit 8.

On the other hand, when the Y-axis direction of receiving antenna array 1*b* is sufficiently long, L-shaped heat pipes 9 are considered in combination instead of U-shaped heat pipes 9 (9*g*, 9*h*). There is no possibility of hindering heat radiation of other heat generating devices arranged in antenna adapter 2 by adopting the structure in which condenser 21 of heat pipe 9 disposed on the +Y-axis side of receiving antenna array 1*b* is bent toward the −Y axis side while condenser 21 of heat pipe 9 disposed on the −Y axis side of receiving antenna array 1*b* is bent toward the +Y-axis side. Furthermore, the length in the Y-axis direction of antenna adapter 2 is not required to redundantly extend for the heat radiation, so that the weight of antenna device 102 can be reduced.

In the description, L-shaped heat pipe 9 (9*a* to 9*d*) including one bend in heat pipe 9 is partially used. However, condensers 21 of L-shaped heat pipe 9 may be coupled to form U-shaped heat pipe 9 (9*g*, 9*h*). That is, heat pipe 9 (9*g*, 9*h*) that is formed by connecting heat pipe 9 (9*a* to 9*d*) including the condenser bent in the same direction as the traveling direction of the mobile body and heat pipe 9 (9*a* to 9*d*) including the condenser bent in the direction opposite to the traveling direction of the mobile body may be used.

Note that appropriately combining, modifying, or omitting each embodiment is also included in the scope of the technical idea described in the embodiments.

REFERENCE SIGNS LIST

1: antenna array, 1*a*: transmitting antenna array, 1*b*: receiving antenna array, 2: antenna adapter, 3: radome, 4: skirt, 5, 5*a*, 5*b*, 5*c*, 5*d*, 5*e*, 5*f*: mounting bracket, 6: power supply, 7: mobile body surface, 8: control circuit, 9: heat pipe, 9*a*, 9*b*, 9*c*, 9*d*: L-shaped heat pipe, 9*e*, 9*f*, 9*g*, 9*h*: U-shaped heat pipe, 10: wick, 11: through-hole, 12: communication IC, 13: antenna element, 14: elastic body, 15*a*, 15*b*: bolt, 16: bracket, 17: cushioning material, 18: vaporized working fluid, 19: liquefied working fluid, 20: evaporator, 21: condenser, 22: wiring through-hole, 23: groove, 100, 101, 102: antenna device

The invention claimed is:

1. An antenna device comprising:
   an antenna array including an antenna element that transmits or receives a communication radio wave;
   an antenna adapter holding the antenna array and having a gap from a mobile body surface;
   a radome disposed so as to cover the antenna adapter;
   a skirt to shield the gap between the mobile body surface and the antenna adapter from flowing outside air and to radiate heat from the antenna adapter; and
   a heat pipe including an evaporator and a condenser that condenses a working fluid vaporized in the evaporator, the heat pipe being disposed to extend from the antenna array toward the skirt.

2. The antenna device according to claim 1, wherein the heat pipe includes a bent portion,
   the evaporator is disposed along the antenna array, and the condenser is disposed along the skirt.

3. The antenna device according to claim 1, wherein the evaporator of the heat pipe is disposed in a direction perpendicular to a traveling direction of the mobile body.

4. The antenna device according to claim 1, wherein the condenser of the heat pipe is disposed along the traveling direction of the mobile body.

5. The antenna device according to claim 1, wherein the heat pipe includes: a first bent heat pipe including the condenser and provided in an identical direction to the traveling direction of the mobile body; and a second bent heat pipe including the condenser and provided in a direction opposite to the traveling direction of the mobile body.

6. The antenna device according to claim 5, further comprising a third heat pipe configured by connecting the first heat pipe and the second heat pipe.

7. The antenna device according to claim 1, wherein the heat pipe is installed inside the antenna adapter along a groove provided in the antenna adapter.

8. The antenna device according to claim 1, wherein the condenser is installed above the evaporator in the heat pipe.

9. The antenna device according to claim 1, wherein the working fluid used for the heat pipe is not frozen under a use environment of the heat pipe.

10. The antenna device according to claim 1, wherein the mobile body is an aircraft.

* * * * *